H. H. CHAPIN.
Traction-Vehicles.

No. 161,006.  Patented March 23, 1875.

Witnesses:
Jas. J. Duhamel.
Thomas Byrne.

Inventor:
H. H. Chapin
Per H. S. Abbot
Attorney.

United States Patent Office.

HENRY H. CHAPIN, OF ADRIAN, MICHIGAN.

IMPROVEMENT IN TRACTION-VEHICLES.

Specification forming part of Letters Patent No. 161,006, dated March 23, 1875; application filed January 23, 1875.

*To all whom it may concern:*

Be it known that I, HENRY H. CHAPIN, of Adrian, county of Lenawee and State of Michigan, have invented certain new and useful Improvements in Street-Cars, of which the following is a specification:

The object of my invention is to furnish a continuous track for street-cars, carriages, &c., for common roads; and it consists in one or more series of trucks, each truck carrying a section of track, which run around endless jointed tracks, the trucks on either of the endless tracks running independently of those on the other tracks, and the different sections of the endless jointed tracks connected with the corresponding sections of the track on the opposite side by means of sliding bars, all as hereinafter more fully set forth.

In order to enable others skilled in the art to which my invention appertains to make and use the same, I will now proceed to describe its construction and operation, referring to the annexed drawing which forms a part of this specification, and in which—

Figure 1:
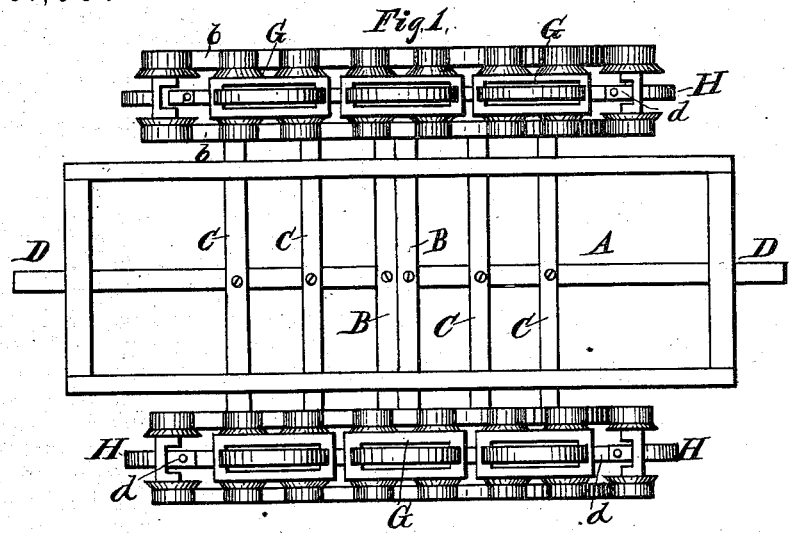
Figure 2:
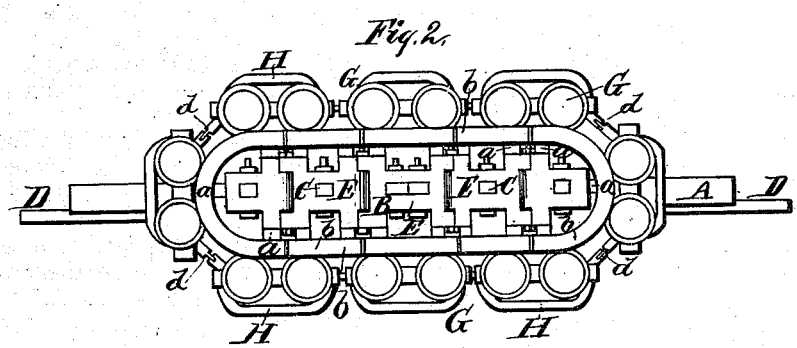
Figure 3:

Figure 1 is a plan view, and Fig. 2 a side elevation, of a car-frame embodying my invention. Fig. 3 is a plan view of one of the jointed endless tracks.

A represents a frame for a car, carriage, or wagon, of any suitable dimensions. In the center of this frame are two cross-bars, B B—or only one, if so desired—which project a suitable distance beyond the sides of the frame, and in front and rear of said bars are a suitable number of similar cross-bars, C C. These latter bars, however, are capable of sliding laterally in the frame, and are moved by means of levers D D.

On each side of the frame A, to the ends of the bars B B, is secured a block, E; and similar blocks are secured, or rather pivoted, on the ends of the bars C. The blocks E E on each side of the frame are united together by means of vertical bolts. On top and bottom of each block are cross-bars $a\ a$, upon the ends of which are fastened rails $b\ b$, the rails on the front and rear blocks being made semicircular or continuous from top to bottom, the whole forming an endless jointed track.

The ends of the rails on the various blocks are made to overlap each other when the track is straight, as shown in Fig. 3, so that when the track is turned to guide the car around a curve it will still form a smooth continuous track for the wheels of the trucks to run upon.

Upon each of the jointed endless tracks thus constructed is placed a chain or series of trucks, G G, connected together by means of suitable hinged couplings, $d\ d$, forming an endless chain of trucks around the track. Between the wheels of each truck G, lengthwise with the same, on the outer side, projects a shoe, H, sufficiently far beyond the wheels as not to allow them to touch the ground.

The car or vehicle thus constructed may be propelled by horses, steam, or other suitable power.

By means of the levers D D the bars C C may be moved to the right or left, so as to turn the jointed tracks $b$ and change the direction of the car, as may be desired.

As each train of trucks runs on a separate track, and is disconnected from the train running on the opposite track, the one may run faster or slower than the other in turning a curve or corner.

The car may be converted into, and run as, a sleigh by applying suitable brakes, or otherwise fastening the trucks from running on the endless track, the shoes H, which bear upon the ground, taking the place of sleigh-runners.

Having thus fully described my invention, what I claim as new, and desire to secure by Letters Patent, is—

1. An endless jointed track, $a\ a\ a\ a$, provided with a train of trucks flexibly connected together, and each truck carrying a shoe or section of track, all combined substantially as set forth.

2. The combination of two or more series of trains of trucks flexibly connected together, and to run independently upon endless jointed tracks, substantially as set forth.

3. The combination, with two or more endless jointed tracks, of sliding bars connecting the corresponding sections of the tracks, and levers for operating said sliding bars, substantially as and for the purposes set forth.

4. In an endless jointed track, the rails of the various sections, constructed to overlap each other at the ends, substantially as and for the purposes set forth.

In testimony that I claim the foregoing as my invention I hereunto affix my signature this 18th day of January, 1875.

HENRY H. CHAPIN.

Witnesses:
C. A. STACY,
WILLIS MERRITT.